UNITED STATES PATENT OFFICE.

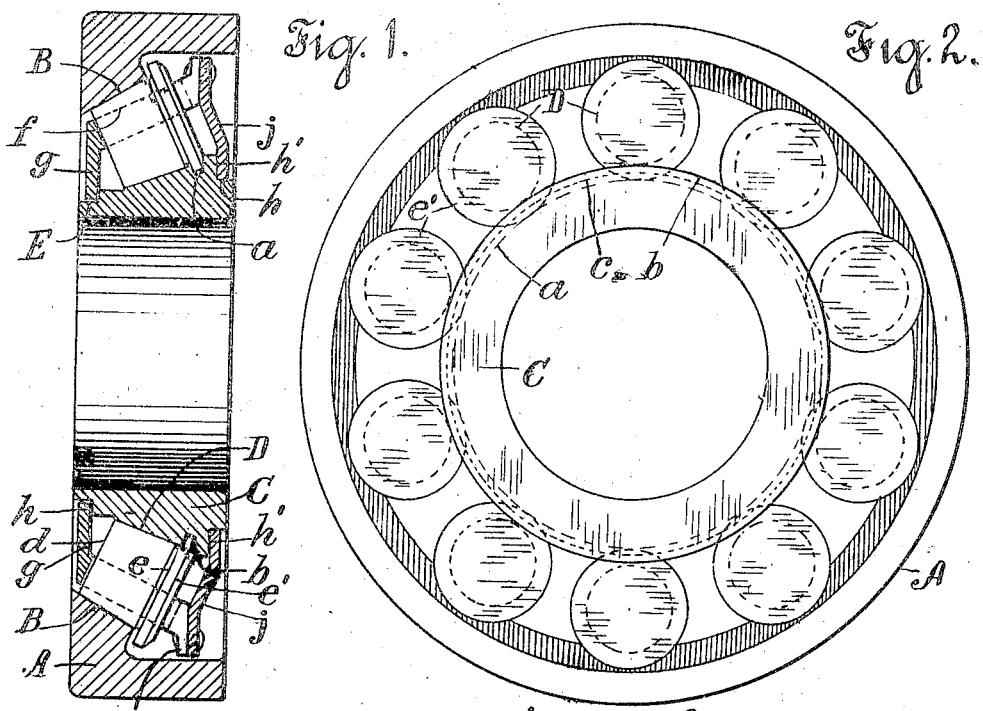
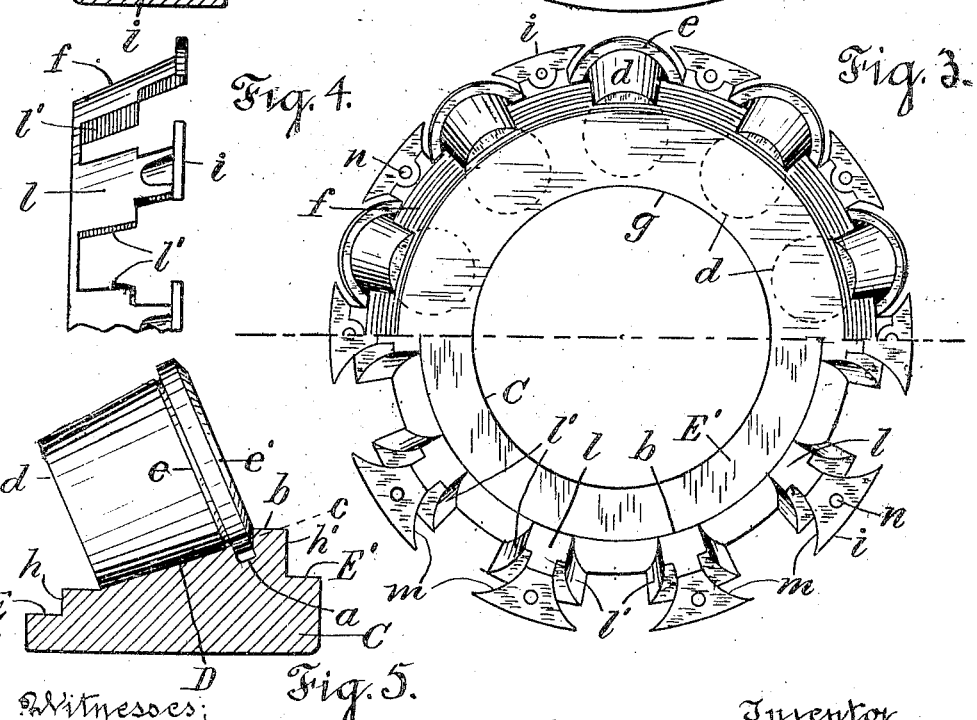

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

ANTIFRICTION ROLLER-BEARING.

1,104,363.

Specification of Letters Patent. Patented July 21, 1914.

Application filed October 4, 1912. Serial No. 723,846.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Antifriction Roller-Bearings, fully described and represented in the following specification and the accompanying drawings, forming a part of the same.

The present invention relates to a roller-bearing operating with tapering rolls, which are often used instead of cylindrical rolls because they are adapted to resist a considerable degree of longitudinal thrust. In such bearings, the hub has a conical seat to receive the series of rolls, and the casing has a tapering seat to embrace the outer sides of the rolls, and the flaring character of the rolls tends when the load is placed upon the bearing, to force them toward the upper ends of the conical seat on the hub. Various means have been devised to sustain the end thrust of the rolls under this tendency, and the object of the present invention is to provide a means of accomplishing this object without adding materially to the friction of the bearing. This I effect by forming the conical seat upon the hub with a groove at its larger end, projecting an annular flange from the hub at the outer side of the said groove beyond the line of the conical seat, and providing each roll with a collar fitted to the groove and contacting with the said flange at substantially equal distances outside and inside of the line of the conical seat.

Roll-collars have been fitted to grooves upon the hub of a bearing to resist end motion, but the walls of such a groove are commonly extended into the hub and thus have a periphery less in circumference than the conical seat upon the hub which carries the rolls. The roll-collars fitted to such grooves have a periphery greater than the periphery of the rolls, and thus revolve at a greater velocity than the surface of the rolls, and produce a material amount of rubbing friction where they contact with the walls of the groove, and a strong tendency to retard that end of the roll, and twist it from its normal position. Such friction is substantially neutralized in my invention by the contact of the roll-collar with the annular flange next the groove at points outside and inside the line of the conical seat upon which the rolls revolve.

That portion of the roll-collar which contacts with the flange inside the groove is larger in circumference than the periphery of the roll, and thus revolves at a slower speed and tends to advance that end of the roll, while that portion of the roll-collar which contacts with the outer part of the flange has a circumference less than the periphery of the roll and tends to accelerate the same end. Such retardation and acceleration are made substantially equal and thus correct any tendency to disturb the normal rotations of the rolls.

Where a roll contacts with some portion of the hub at one end only, it generally causes such end to drag behind the opposite end which, where the cage embraces the roll twists the opposite ends of the rolls against the opposite sides of the pockets in the cage and produces a great deal of unnecessary friction. Where a collar upon the roll engages a groove at one end of the roll, it is obvious that such results would occur unless means were found to counteract the twisting tendency, and this means is fully provided by my construction which tends equally to advance or accelerate the larger end of the roll and to retard the same, thus leaving it in a balanced condition capable of turning freely in the pockets in the cage.

To keep the roll-collars in the proper relation to the flange which resists the endwise movement of the rolls, and the rolls in proper alinement with the hub, a cage is furnished that fits accurately against the sides of the rolls and guides them accurately, while permitting their free rotation. Such cage is shown in the drawing formed of antifriction metal, as gun-metal, with pockets milled at their sides to fit the rolls accurately, a flange at the smaller end of the cage to fit a cage-seat upon the hub, a riveting-flange at the larger end of the cage, and a ring secured to such riveting-flange and fitted to turn upon a cage-seat on the larger end of the hub.

The invention will be understood by reference to the annexed drawing, in which—

Figure 1 is a longitudinal section of a bearing with the rolls not in section; Fig. 2 shows the open end of the casing and the larger end of the hub with the rolls fitted thereto and the entire cage omitted; Fig. 3 shows in its upper half the smaller end of the cage with the rolls in their respective pockets, and in the lower half the larger end of the cage with the pockets empty; Fig. 4 is an edge view of the upper half of the cage; and Fig. 5 is a diagram showing one side of the hub in section, as in Fig. 1, with the roll fitted thereto, this figure being greatly enlarged.

A designates the casing of the bearing with the tapering roll-seat B therein.

C designates the hub with tapering roll-seat D, and annular cage-seats E and $h$ at opposite ends to guide the cage thereon. The hub has a groove $a$ at the larger end of the roll-seat, its inner wall being at right angles to the conical surface of the seat, and an annular flange $b$ projected at the outer side of the groove, beyond the line $c$ of Fig. 5, which is extended from the conical surface of the seat, and indicates the path of the rolls' surface.

Each roll $d$ is shaped to fit the roll-seat, and is provided with collar $e$ having its outer side $e'$ conical to coincide with the flat surface of the annular flange $b$.

The conical surface $e'$ touches the flat surface of the annular flange $b$ at only a single line and thus rolls upon it with the least possible friction. Such conical surface of the roll is proportioned, as shown in Fig. 5, to extend equally inside and outside of the line $c$, so that the collar at its contact with the flange $b$ inside and outside of such line, revolves respectively at greater and less velocity than the surface of the rolls where they rest upon the roll-seat D. The retarding and accelerating effect of such contacts are thus practically balanced, and no tendency is created to twist the rolls out of their normal positions. Their resistance to guidance by the cage is thus reduced to a minimum, and they are enabled to rotate in the pockets without any material pressure against the surface $l'$.

If the outer surface $e'$ of the roll-collar were made flat, it would require an undercut surface upon the annular flange $b$ to fit it, and such undercut surface would be concave, and would contact with the corners of the roll-collar and thus generate a great deal of friction.

In order to hold the rolls accurately in their working positions, it is desirable in this construction to employ a cage made of anti-friction metal as gun-metal or type-metal, with all the bearing surfaces accurately finished by turning or milling so as to reduce the friction wherever it contacts with the roll, hub or casing. Such cage has a conical or tapering body-portion $f$ with an integral flat annular guide-frame $g$ upon its smaller end to fit the cage-seat E at the smaller end of the hub, and the larger end of the body has a flat riveting-flange $i$ to which a ring $j$ is secured to rest upon the seat $h$ on the larger end of the hub. The hub is formed with shoulders adjacent to the seats, and when the ring $j$ is riveted to the end of the cage the ring and the guide-frame $g$ move close to the shoulders and thus hold the cage movable in the desired position.

The tapering body $f$ is perforated to form pockets to receive the rolls $d$ and their collars $e$. The portions of the body between the pockets form inclined spokes or guide-arms $l$. The inner side of the body is coincident with the center line of the rolls, and the sides of the pockets are milled accurately to fit the curvature of the rolls on their outer sides, as shown at $l'$ in the lower part of Fig. 3. The upper ends of the pockets have recesses $m$ in their opposite sides to clear the edges of the roll-collar $e$, thus dividing the riveting-flange $i$ into sections (one upon the end of each guide-arm $l$) provided with rivet-holes $n$, as shown in Fig. 3. The pockets are thus shaped, so that before the ring $j$ is attached to the cage, the rolls may be set upon the hub and the open ends of the pockets applied to the same and the cage pushed over the rolls into the position shown in Fig. 1. The ring $j$ is then riveted to the riveting-flange $i$, which secures the cage movably and permanently upon the hub, with the curved sides $l'$ of the pockets fitting accurately but movably to the sides of each roll upon its outer half. The rolls are thus assembled and retained upon the hub, so that the hub and rolls can be handled as a unit in transportation, or in applying them to the casing.

The hub and rolls are, in practice, made of hardened steel ground accurately to the required shape and dimensions, and the whole construction is adapted for a very high-class bearing in which heavy loads are imposed upon the bearing, and the rolls are enabled to sustain them, and revolve with a minimum of friction, because the cage guides them accurately in the proper path about the hub.

Having thus set forth the nature of the invention what is claimed herein is:

In a roller bearing, the combination, with a hub having a conical roll-seat with an annular groove near the larger end and an annular flat flange next such groove projecting outward beyond the conical roll-seat, of a series of tapering rolls fitted to the roll-seat and having collars rotating in said groove and beveled upon their outer surface to contact with the flat surface of the said flange, the beveled surface being proportioned to bear equally upon the flange at the outside and inside of the line of the conical roll-seat, whereby the accelerating and retarding influence of the friction upon such collars are substantially equalized.

In testimony whereof I have hereunto set my hand in the presence of two subscribing witnesses.

CHARLES S. LOCKWOOD.

Witnesses:
E. WILLIAMS,
M. E. JAHN.